(12) United States Patent
Zhou et al.

(10) Patent No.: US 12,357,432 B2
(45) Date of Patent: Jul. 15, 2025

(54) METHOD FOR GENERATING 3D DIGITAL MODEL OF TEETH

(71) Applicant: WUXI EA BIOTECHNOLOGY LIMITED, Jiangsu (CN)

(72) Inventors: Ketuo Zhou, Shanghai (CN); Lei Huang, Shanghai (CN)

(73) Assignee: Wuxi EA Biotechnology Limited, Jiangsu (CN)

( * ) Notice: Subject to any disclaimer, the term of this patent is extended or adjusted under 35 U.S.C. 154(b) by 383 days.

(21) Appl. No.: 17/799,039

(22) PCT Filed: Jan. 25, 2021

(86) PCT No.: PCT/CN2021/073622
§ 371 (c)(1),
(2) Date: Aug. 11, 2022

(87) PCT Pub. No.: WO2021/179811
PCT Pub. Date: Sep. 16, 2021

(65) Prior Publication Data
US 2023/0072374 A1    Mar. 9, 2023

(30) Foreign Application Priority Data

Mar. 13, 2020 (CN) .......................... 202010174621.7

(51) Int. Cl.
*G06T 7/70* (2017.01)
*A61C 9/00* (2006.01)
(Continued)

(52) U.S. Cl.
CPC ............ *A61C 9/0053* (2013.01); *A61C 13/34* (2013.01); *A61C 19/04* (2013.01); *G06T 7/70* (2017.01);
(Continued)

(58) Field of Classification Search
CPC ....... A61C 9/0053; A61C 13/34; A61C 19/04; A61C 2204/005; G06T 7/70; G06T 19/20;
(Continued)

(56) References Cited

U.S. PATENT DOCUMENTS

2015/0182301 A1* 7/2015 Hegland .............. A61C 19/066
433/29
2016/0338803 A1* 11/2016 Pesach ...................... G06T 7/74
(Continued)

FOREIGN PATENT DOCUMENTS

CN    103258070 A    8/2013
CN    206473416 U    9/2017
(Continued)

OTHER PUBLICATIONS

Besl, P. J., et al., "A method for registration of 3-D shapes", IEEE Transactions on Pattern Analysis and Machine Intelligence, 14(2), Feb. 1992, 239-256.
(Continued)

*Primary Examiner* — Xiao M Wu
*Assistant Examiner* — George Renze
(74) *Attorney, Agent, or Firm* — Elmore Patent Law Group, P.C.; Joseph C. Zucchero; Carolyn S. Elmore

(57) ABSTRACT

One aspect of the present application provides a method for generating 3D digital model of teeth, the method comprises: scanning a patient's teeth with a first feeler gauge inserted in a first gap between two adjacent teeth, to obtain a first 3D digital model; extracting a position and a direction of the first feeler gauge from the first 3D digital model; and modifying the first gap of an original 3D digital model of teeth based on the specification, position and direction of the first feeler gauge, to obtain a refined 3D digital model of teeth.

8 Claims, 2 Drawing Sheets

(51) Int. Cl.
  *A61C 13/34*  (2006.01)
  *A61C 19/04*  (2006.01)
  *G06T 17/00*  (2006.01)
  *G06T 19/20*  (2011.01)

(52) U.S. Cl.
  CPC .............. *G06T 17/00* (2013.01); *G06T 19/20* (2013.01); *G06T 2200/08* (2013.01); *G06T 2207/30201* (2013.01); *G06T 2207/30204* (2013.01); *G06T 2210/41* (2013.01); *G06T 2219/2004* (2013.01); *G06T 2219/2021* (2013.01)

(58) Field of Classification Search
  CPC .............. G06T 2200/08; G06T 2210/41; G06T 2219/2004; G06T 2219/2021
  See application file for complete search history.

(56) References Cited

U.S. PATENT DOCUMENTS

| | | | | |
|---|---|---|---|---|
| 2017/0128173 A1* | 5/2017 | Berner | .................. | A61C 9/0053 |
| 2017/0231718 A1* | 8/2017 | Wohrle | .................. | A61C 1/082 |
| | | | | 433/27 |
| 2018/0078347 A1* | 3/2018 | Falkel | ...................... | A61B 1/24 |
| 2018/0085203 A1* | 3/2018 | Ramirez | .................. | A61C 5/77 |
| 2019/0029775 A1 | 1/2019 | Morton et al. | | |
| 2019/0239987 A1* | 8/2019 | Jones | ....................... | A61C 7/08 |

FOREIGN PATENT DOCUMENTS

| | | |
|---|---|---|
| CN | 108567501 A | 9/2018 |
| CN | 110192923 A | 9/2019 |
| CN | 110547888 A | 12/2019 |

OTHER PUBLICATIONS

Chen, Y., et al., "Object modeling by registration of multiple range images", Proceedings. 1991 IEEE International Conference on Robotics and Automation, Sacramento, CA, USA, vol. 3, 2724-2729.

Glira, P., et al., "A Correspondence Framework for ALS Strip Adjustments based on Variants of the ICP Algorithm", Photogrammetrie—Fernerkundung—Geoinformation Jahrgang Heft 4 , Aug. 1, 2015.

Glira, P., et al., "Rigorous Strip Adjustment of Airborne Laserscanning Data Based on the Icp Algorithm", ISPRS Annals of the Photogrammetry, Remote Sensing and Spatial Information Sciences, vol. II-3/W5, 2015; ISPRS Geospatial Week 2015, Sep. 28-Oct. 3, 2015, La Grande Motte, France, Ed. Oude, 73-80.

* cited by examiner

METHOD FOR GENERATING 3D DIGITAL MODEL OF TEETH

FIELD OF THE APPLICATION

The present application generally relates to a method for generating 3D digital model of teeth, particularly a method for generating 3D digital model of teeth with precise sizes of gaps between adjacent teeth.

BACKGROUND

With development of computer science, dental professionals use computer technologies to improve efficiency of dental diagnosis and treatment increasingly. In many cases, a 3D digital model of a dentition is needed in dental diagnosis and treatment using computer technologies.

At present, the following are most common methods for obtaining 3D digital model of dentition: intra-oral scanning, scanning an impression and scanning a positive model (e.g., a plaster model of the dentition). However, the inventors of the present application discover that it is very difficult to scan small gaps between adjacent teeth due to factors such as optical reachability, scanning resolution, and fluidity, rigidity and structural continuity of an impression-taking material.

The inventors of the present application believe that sizes of gaps between adjacent teeth is important information for dental orthodontic treatment. Precise information about gaps between adjacent teeth brings the following advantages: (1) help avoid collision between adjacent teeth during movements of teeth such as torsion and orthoaxis; (2) help enhance re-positioners' performance on encapsulation of teeth to achieve better force-applying structures, better performance on holding on teeth and better performance on root-controlling; (3) help ensure proper final tooth arrangements so that gaps between teeth are within a reasonable range (e.g., a gap is just enough for a floss to pass through).

In view of the above, it is necessary to provide a method for generating 3D digital model of dentition with precise sizes of gaps between adjacent teeth.

SUMMARY

One aspect of the present application provides a method for generating 3D digital model of teeth, the method comprises: scanning a patient's teeth with a first feeler gauge being inserted in a first gap between two adjacent teeth, to obtain a first 3D digital model; extracting a position and a direction of the first feeler gauge from the first 3D digital model; and modifying the first gap of an original 3D digital model of teeth based on the specification, position and direction of the first feeler gauge, to obtain a refined 3D digital model of teeth.

In some embodiments, the first feeler gauge carries marks indicating its specification, a corresponding part of the first 3D digital model also carries the marks, and the specification of the first feeler gauge is extracted from the first 3D digital model.

In some embodiments, the specification of the feeler gauge comprises thickness.

In some embodiments, the method for generating 3D digital model of teeth may further comprise: obtaining a second 3D digital model representing the patient's teeth with no feeler gauge inserted in the first gap, wherein the original 3D digital model of teeth is the second 3D digital model.

In some embodiments, modifying the first gap of the original 3D digital model of teeth may comprise: removing a part occupied by the first feeler gauge when it is inserted in the first gap; and reconstructing proximal surfaces of the two adjacent teeth corresponding to the first gap based on a 3D digital model of teeth obtained by the removal operation, to obtain a refined 3D digital model of teeth.

In some embodiments, a first end of the first feeler gauge outside the first gap is large enough to be scanned by a scanning device that obtains the first 3D digital model by scanning to obtain a 3D digital model of the first end, wherein the position and direction of the first feeler gauge is extracted from the 3D digital model of the first end on the first 3D digital model.

In some embodiments, the first end of the first feeler gauge may carry marks indicating the specification of the first feeler gauge, the 3D digital model of the first end on the first 3D digital model carry the marks accordingly, and the specification of the first feeler gauge may be extracted from the 3D digital model of the first end on the first 3D digital model.

In some embodiments, the marks may be three-dimensional.

In some embodiments, the marks may be one of the following: characters, pattern, bar code, QR code and any combinations thereof.

BRIEF DESCRIPTION OF THE DRAWINGS

The above and other features of the present application will be further illustrated below with reference to figures and their detailed depictions. It should be appreciated that these figures only show several exemplary embodiments according to the present application, so they should not be construed as limiting the protection scope of the present application. Unless otherwise specified, the figures are not necessarily drawn to scale, and like reference numbers therein denote like components.

DETAILED DESCRIPTION OF ILLUSTRATED EMBODIMENTS

In the following detailed depiction, reference is made to the accompanying drawings, which form a part thereof. Exemplary embodiments in the detailed description and figures are only intended for illustration purpose and not meant to be limiting the protection scope of the present application. Inspired by the present application, those skilled in the art can understand that other embodiments may be utilized and other changes may be made to the depicted embodiments, without departing from the spirit or scope of the present application. It will be readily understood that aspects of the present application described and illustrated herein can be arranged, replaced, combined, separated and designed in a wide variety of different configurations, all of which are explicitly contemplated and make part of the present application.

In clinical practice of orthodontic treatment, for the following cases, it is helpful to better fulfill an orthodontic treatment if precise information of gaps between specific adjacent teeth is obtained.

For example, in some cases, when an orthodontic treatment is completed, a dental professional will check gaps between adjacent teeth again to determine whether the gaps are within a desired range (e.g., the size of a gap between adjacent teeth is slightly larger than a size allowing floss to pass through). If it is found that a gap is too large or too small, the size of the gap may be further adjusted. If the adjustment is performed with a shell-shaped repositioner, a 3D digital model of the dentition with precise gaps needs to be obtained.

As another example, in some cases, before some tooth movements (e.g., torsion and orthoaxis) are implemented, precise information of gaps of corresponding pairs of adjacent teeth needs to be obtained to avoid collision between the adjacent teeth when these movement are implemented. If the orthodontic treatment is performed with shell-shaped repositioners, 3D digital models of dentitions with precise gaps need to be obtained.

Inspired by the present application, it is understood that cases in which 3D digital models of dentitions with precise gaps between adjacent teeth are needed are not limited to the cases listed above, and will not be enumerated here.

Inspired by the present application, it is understood that a 3D digital model of only partial dentition with precise gaps between specific pairs of adjacent teeth is needed in some cases. In some cases, a 3D digital model of an entire dentition with precise gaps between specific pairs of adjacent teeth is needed.

One aspect of the present application provides a method for generating 3D digital model of teeth, to obtain a 3D digital model of teeth with precise gaps between specific pairs of adjacent teeth.

Figure 1:
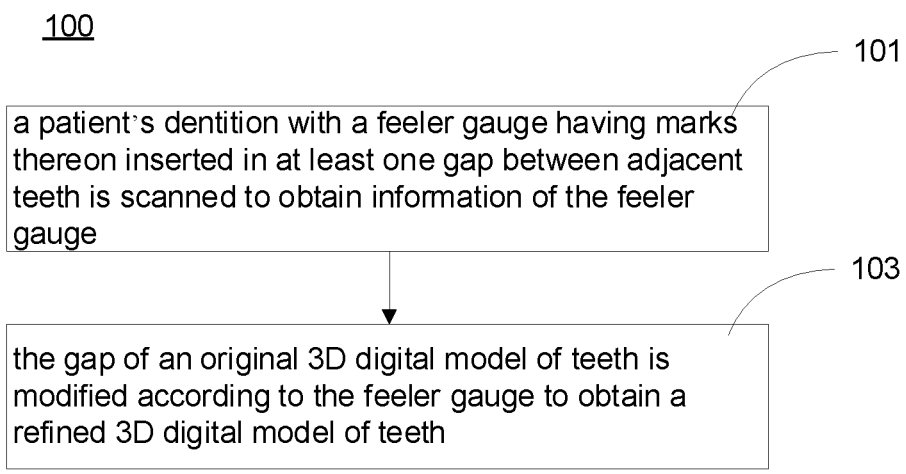
FIG. 1 schematically illustrates a flow chart of a method for generating 3D digital model of teeth according to one embodiment of the present application.

Referring to FIG. 1, it is an illustrative flow chart of a method 100 of generating 3D digital model of teeth according to one embodiment of the present application.

In 101, a patient's dentition with a feeler gauge having marks thereon inserted in at least one gap between adjacent teeth is scanned to obtain information of the feeler gauge.

In one embodiment, the at least one gap between adjacent teeth is pre-selected according to specific needs.

In one embodiment, a first 3D digital model representing the dentition having the feeler gauge inserted therein may be obtained by the scanning.

In one embodiment, a scanning device for scanning a patient's dentition may be a monochrome scanning device, that is, the 3D digital model obtained by scanning with the scanning device is monochromatic. In such case, the marks on the feeler gauge may be three-dimensional so that the first 3D digital model carries these marks correspondingly. A computer is able to recognize these marks on the first 3D digital model, and obtain from a database the specification of the feeler gauge corresponding to these marks.

In another embodiment, the scanning device may be a color scanning device, that is, the 3D digital model obtained by scanning with such a scanning device is chromatic. In this case, the marks on the feeler gauge may be planar or three-dimensional, and the first 3D digital model carries these marks correspondingly. A computer is able to recognize these marks on the first 3D digital model, and obtain from a database the specification of the feeler gauge corresponding to these marks.

In one embodiment, the specification of the feeler gauge comprises thickness of the feeler gauge. In a further embodiment, the specification of the feeler gauge comprises thickness of the feeler gauge as well as cross-sectional shape of the feeler gauge.

In one embodiment, the marks of the feeler gauge may be characters, numbers, geometrical shapes, bar codes, QR codes and any combinations thereof.

In one embodiment, positions and directions of the feeler gauges may be extracted from the first 3D digital model using a computer. In one embodiment, the direction of a feeler gauge may be represented by its thickness direction (namely, normal direction of its side surface).

In one embodiment, one end of the feeler gauge outside the gap between adjacent teeth has a sufficiently large size so that the scanning device can obtain the 3D digital model of this part by scanning. For example, the geometry of the part may be a triangular column, a cylinder or a rectangular column, other than flat shape of the main body of the feeler gauge. In one embodiment, the marks of the feeler gauge may be provided on this part. In one embodiment, since the relative positions of the first end and the main body of the feeler gauge are fixed, the positions and directions of the feeler gauge may be extracted/calculated based on the 3D digital model of this part. Especially when the thickness of the feeler gauge is smaller than the resolution of the scanning device, the part of the first 3D digital model corresponding to the main body of the feeler gauge might not be able to precisely express the orientation of the feeler gauge.

In one embodiment, the gap between adjacent teeth in which the feeler gauge is inserted and the specification of the corresponding feeler gauge may be manually identified, for example, may be manually input into the computer system. The position and direction of the feeler gauges may be extracted from the first 3D digital model by the computer.

In 103, the gap of an original 3D digital model of teeth is modified according to the information of the feeler gauge, to obtain a refined 3D digital model of teeth.

In one embodiment, the information of the feeler gauge may comprise the specification, position and direction of each feeler gauge.

In one embodiment, the original 3D digital model of teeth may be the first 3D digital model.

In a further embodiment, a second 3D digital model of the patient's teeth without the feeler gauge inserted may be obtained, for example, the second 3D digital model is regarded as the original 3D digital model of the teeth by directly scanning the patient's dentition, or by scanning a positive model or an impression of the patient's dentition.

In one embodiment, the parts occupied by these feeler gauges when the feeler gauges are inserted into the gaps between adjacent teeth in the original 3D digital model of teeth may be removed based on the specifications, positions and directions of the feeler gauges, for example, by Boolean subtraction. Then, proximal surfaces of the gaps between adjacent teeth may be fitted based on the 3D digital model of teeth obtained by the removal, to obtain a refined 3D digital model of teeth, which has precise gaps between adjacent teeth.

In many cases, for a gap between adjacent teeth which is too small in size, corresponding two teeth are adhered with each other in a 3D digital model of teeth obtained by scanning.

Figure 2A:
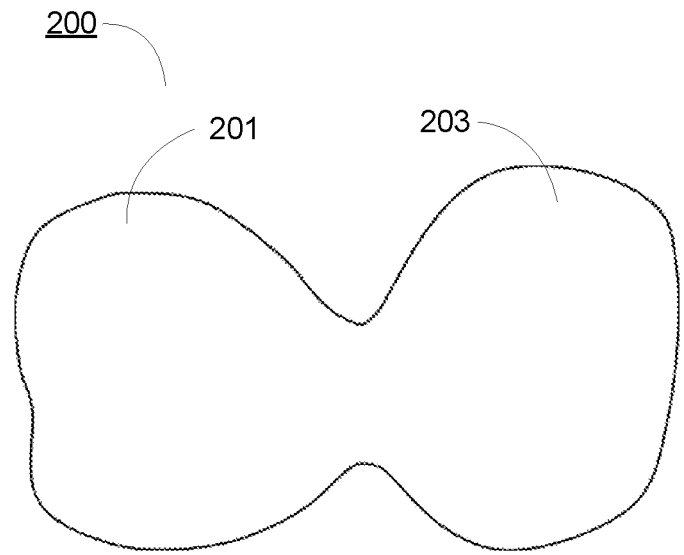
FIG. 2A schematically illustrates a 3D digital model of two adjacent teeth with a small gap in one embodiment of the present application.

Referring to FIG. 2A, it schematically illustrates a 3D digital model 200 of two adjacent teeth with a small gap in one embodiment of the present application. Since the gap between teeth 201 and 203 is small, the two teeth are adhered with each other in the 3D digital model 200 obtained by scanning.

Figure 2B:
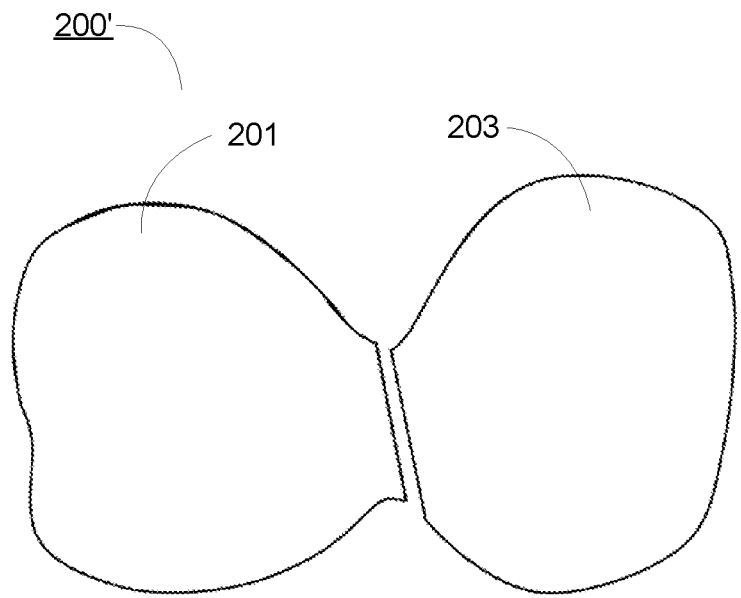
FIG. 2B schematically illustrates a 3D digital model obtained by removing a part occupied by a feeler gauge from the 3D digital model shown in FIG. 2A in one embodiment of the present application.

Referring to FIG. 2B, it schematically illustrates a 3D digital model 200' obtained by removing a part occupied by a feeler gauge from the 3D digital model shown in FIG. 2A in one embodiment of the present application. At this point, the proximal surfaces of the teeth 201 and 203 are planes, and do not tally with actual situations. In one embodiment, the proximal surfaces of the teeth 201 and 203 may be reconstructed based on the 3D digital model 200' by means such as fitting.

In one embodiment, a method similar to the method for reconstructing proximal surfaces of teeth disclosed by Chinese patent application published as CN108567501A may be used. In another embodiment, proximal surfaces of teeth may be reconstructed using an Iterative Closest Point algorithm, references include: "A correspondence framework for ALS strip adjustments based on variants of the ICP algorithm" published by Glira, P., Pfeifer, N., Ressl, C. and Briese, C. on *Journal for Photogrammetry, Remote Sensing and Geoinformation Science* (PFG) 2015(04), pp. 275-289. DOI: 10.1127/pfg/2015/0270; "Rigorous Strip Adjustment of Airborne Laserscanning Data Based on the ICP Algorithm" published by Glira, P., Pfeifer, N., Ressl, C. and Briese, C. on *ISPRS Annals of Photogrammetry, Remote Sensing and Spatial Information Sciences* II-3/W5, pp. 73-80. DOI: 10.5194/isprsannals-II-3-W5-73-2015; "Method for Registration of 3-d shapes" published by Besl, P. J. and McKay, N. D. on *Robotics-DL tentative, International Society for Optics and Photonics*, pp. 586-606; and "Object Modeling by Registration of Multiple Range Images" published by Chen, Y. and Medioni, G. on *Image and Vision Computing* 10(3), pp. 145-155. Range Image Understanding.

Figure 2C:
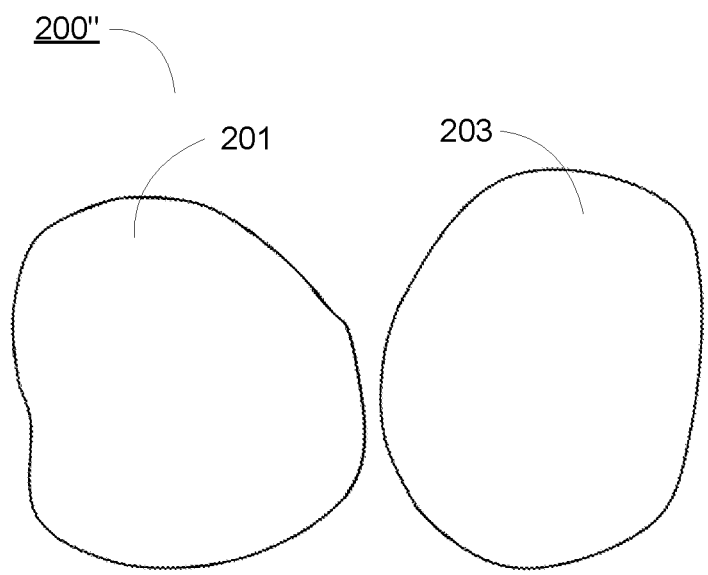
FIG. 2C schematically illustrates a 3D digital model obtained by reconstructing proximal surfaces based on the 3D digital model shown in FIG. 2B in one embodiment of the present application.

Referring to FIG. 2C, it schematically illustrates a 3D digital model 200" obtained by reconstructing proximal surfaces of teeth based on the 3D digital model 200' shown in FIG. 2B in one embodiment of the present application.

In one embodiment, a same gap between adjacent teeth may be inserted with a feeler gauge twice along different directions, and the specification of the feeler gauges used in the two scans may be same or different. The information of the feeler gauges may be obtained by two scans respectively. Then, removal operation may be performed twice on the original 3D digital model of teeth based on the information of the feeler gauges obtained by the two scans, and the proximal surfaces of the teeth may be reconstructed based on the 3D digital model of teeth after the removal operation. The proximal surfaces of teeth reconstructed in this way may be closer to the actual situation.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

Likewise, the various diagrams may depict an example architecture or other configuration for the disclosed method and system, which is done to aid in understanding the features and functionality that can be included in the disclosed method and system. The claimed invention is not restricted to the illustrated example architectures or configurations, but the desired features can be implemented using a variety of alternative architectures and configurations. Additionally, with regard to flow diagrams, operational descriptions and method claims, the order in which the blocks are presented herein shall not mandate that various embodiments be implemented to perform the recited functionality in the same order unless the context dictates otherwise.

Unless the context dictates, terms used herein are generally intended as "open" terms instead of limiting. The use of phrases such as "one or more", "at least" and "but not limited to" should not be construed to imply that the parts of the present application that do not use similar phrases intend to be limiting.

We claim:

1. A computer-implemented method for producing 3D digital model of teeth, comprising:
   obtaining a first 3D digital model of a patient's teeth with a first feeler gauge inserted in a first gap between two adjacent teeth;
   extracting a position and a direction of the first feeler gauge from the first 3D digital model; and
   modifying the first gap of an original 3D digital model of teeth based on the specification, position and direction of the first feeler gauge, to obtain a refined 3D digital model of teeth.

2. The method of claim 1, wherein the first feeler gauge carries marks indicating its specification, a corresponding part of the first 3D digital model also carries the marks, and the specification of the first feeler gauge is extracted from the first 3D digital model.

3. The method of claim 1, wherein the specification of the feeler gauge comprises thickness.

4. The method of claim 1, further comprising: obtaining a second 3D digital model of the patient's teeth with no feeler gauge inserted in the first gap, wherein the original 3D digital model of teeth is the second 3D digital model;
   removing a corresponding part of the second 3D digital model according to the specification, position and direction of the first feeler gauge, to obtain a third 3D digital model, wherein the third 3D digital model defines two planes at the removed part; and
   reconstructing proximal surfaces of the two adjacent teeth based on the third 3D digital model, to obtain the refined 3D digital model of teeth.

5. The method of claim 1, wherein a first end of the first feeler gauge outside the first gap is large enough to be scanned by a scanning device that obtains the first 3D digital model by scanning to obtain a 3D digital model of the first end, where the position and direction of the first feeler gauge is extracted from the 3D digital model of the first end in the first 3D digital model.

6. The method of claim 5, wherein the first end of the first feeler gauge carries marks indicating the specification of the first feeler gauge, the 3D digital model of the first end in the first 3D digital model correspondingly carries the marks, and the specification of the first feeler gauge is extracted from the 3D digital model of the first end in the first 3D digital model.

7. The method of claim 6, wherein the marks are three dimensional.

8. The method of claim 1, wherein the marks are one of the following: characters, patterns, bar codes, QR codes and any combinations thereof.

* * * * *